United States Patent [19]

Knoos

[11] 4,226,226

[45] Oct. 7, 1980

[54] SOLAR ENERGY COLLECTOR

[75] Inventor: Stellan Knoos, Rancho Palos Verdes, Calif.

[73] Assignee: AGA Aktiebolag, Lidingo, Sweden

[21] Appl. No.: 856,255

[22] Filed: Dec. 1, 1977

[51] Int. Cl.² .............................................. F24J 3/02
[52] U.S. Cl. .................................................. 126/432
[58] Field of Search ............................... 126/270, 432

[56] References Cited

U.S. PATENT DOCUMENTS

| | | | |
|---|---|---|---|
| 3,987,782 | 10/1976 | Meier, Jr. ............................ | 126/271 |
| 3,995,615 | 12/1976 | Hojnowski ....................... | 126/270 X |
| 4,054,124 | 10/1977 | Knoos ................................. | 126/270 |
| 4,071,659 | 1/1978 | Santala ............................. | 126/270 X |
| 4,086,908 | 5/1978 | Werner et al. ....................... | 126/270 |
| 4,090,495 | 5/1978 | Lesk .................................. | 126/270 |

*Primary Examiner*—Thomas F. Callaghan

*Attorney, Agent, or Firm*—Fraser and Bogucki

[57] ABSTRACT

A compact, highly versatile, modular solar energy collector is achievable through the employment of well distributed bypass flow components providing a bypass mass flow within a given range across a thin collector face, in conjunction with a low height, laminar interior flow having a predetermined proportionality to the bypass flow. A short flow path length along the collector together with the bypass flow relationship and other parameters permit high temperature differentials to be attained, accompanied by high efficiency. Further, the mass flow through the collector may be varied within a substantial range in response to changing insolation conditions while maintaining the bypass flow in an acceptable range by incorporation of a pressure drop having mass flow dependent characteristics in the principal flow path.

14 Claims, 7 Drawing Figures

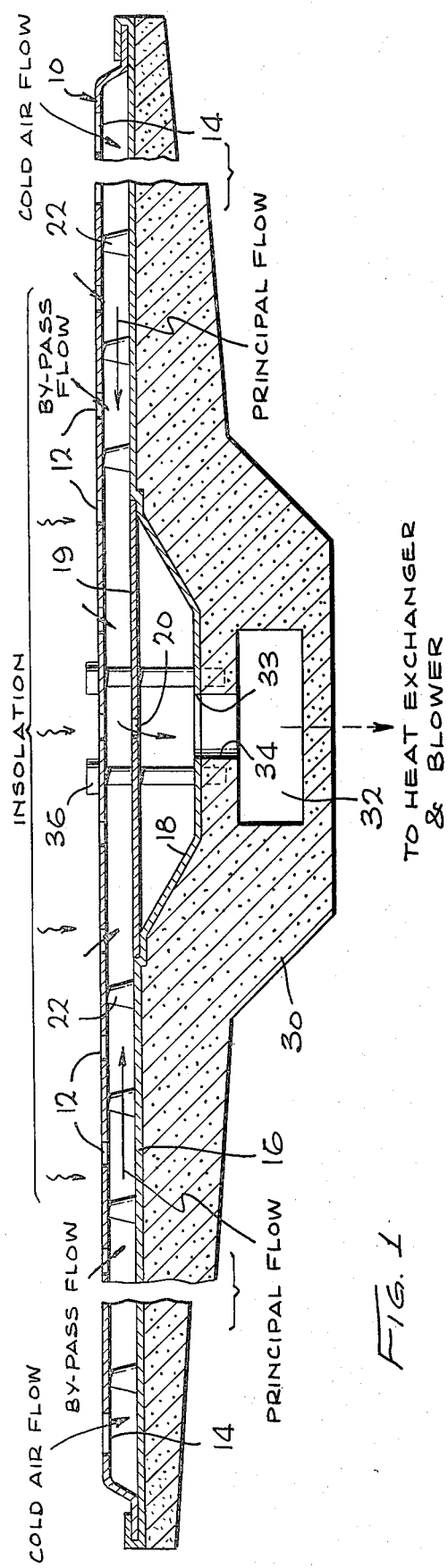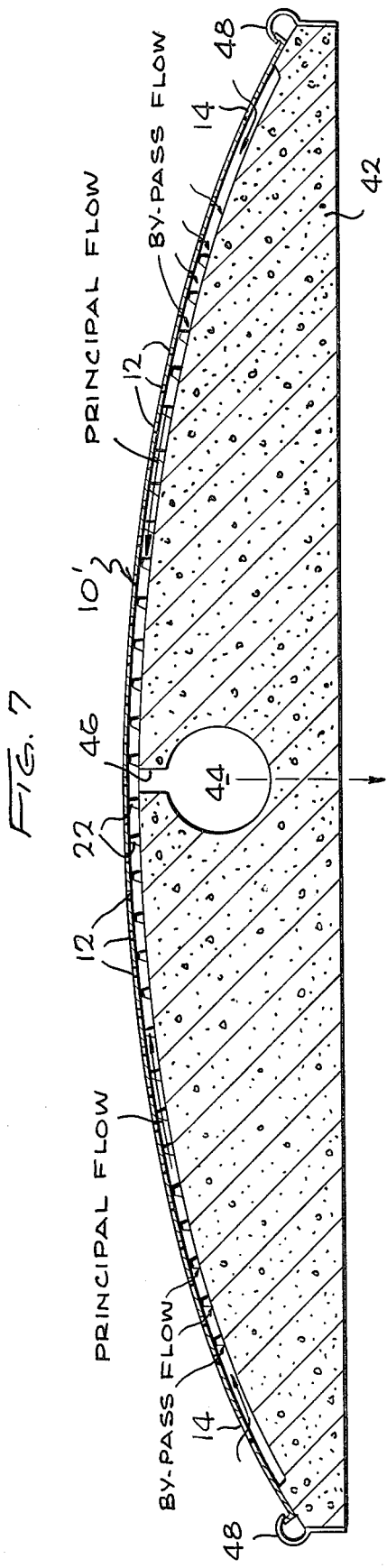

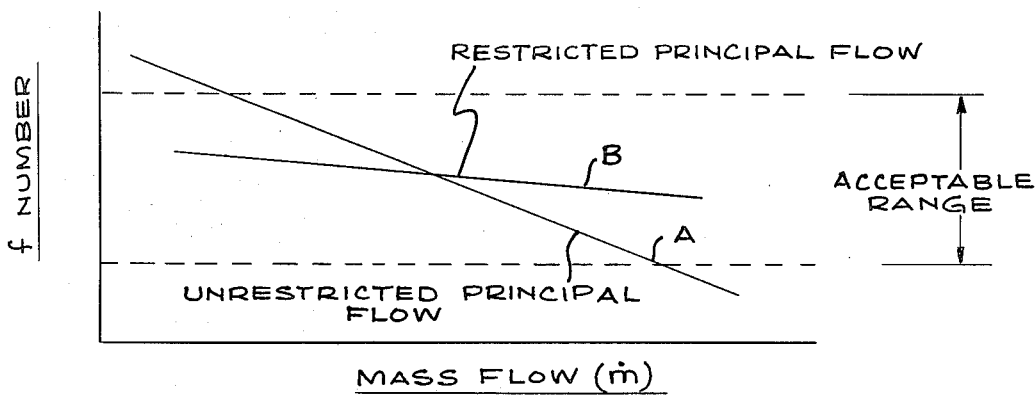
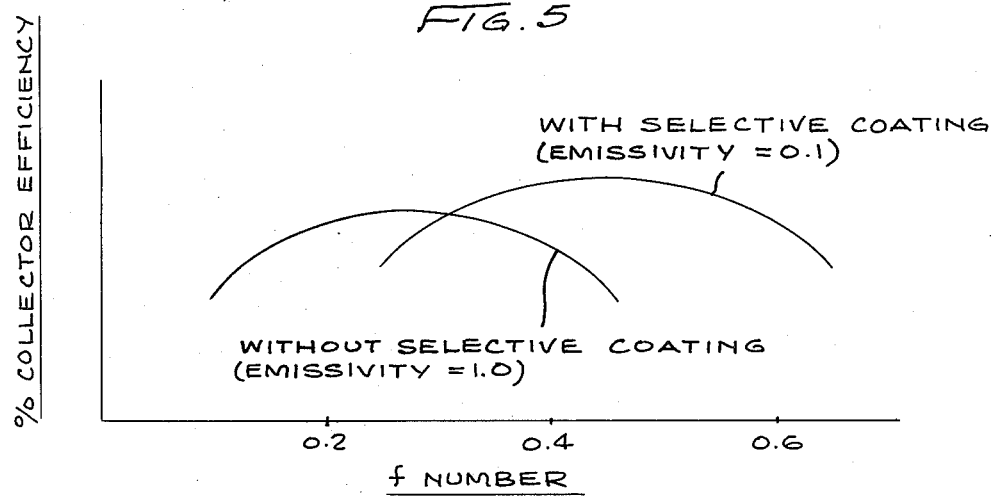
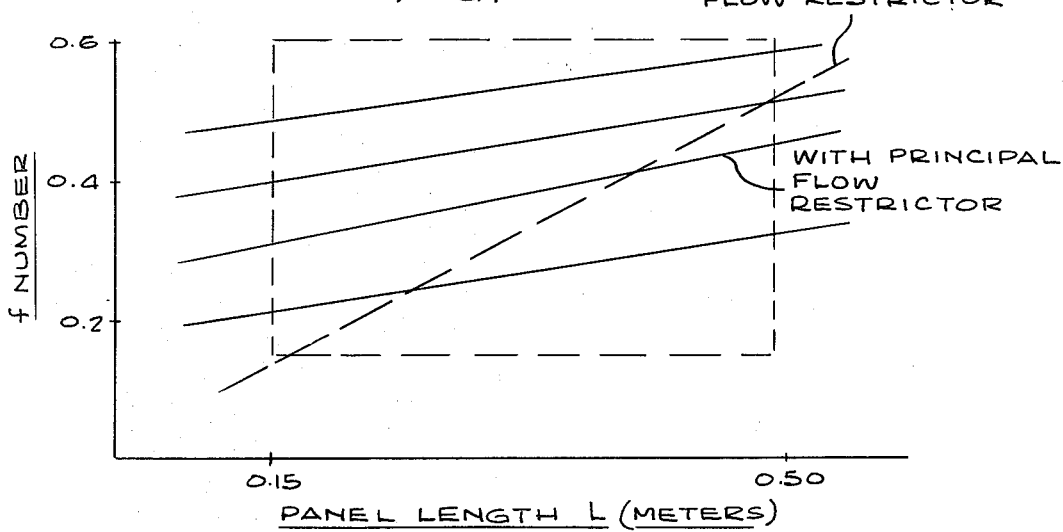

SOLAR ENERGY COLLECTOR

BACKGROUND OF THE INVENTION

The present invention represents an improvement and further extension of the basic dual flow principle for solar radiation collection systems described in U.S. Pat. No. 4,054,124, previously issued to patentee. The referenced patent describes how high performance can be achieved, with a very low time constant, by employing the dual flow principal in conjunction with other factors. Among these factors, the height of the mass flow channel under the collector, with which the bypass flow through apertures in the panel face is to be combined, is specified as having a preferred range of 0.5 to 2.0 mm, the f number (or proportion of the bypass flow to full flow) is discussed in terms of the range of 0.25 to 0.75, and examples of bypass apertures of 0.5 are given. While confirming the validity of the concept and the value of the implementations taught in U.S. Pat. No. 4,054,124, the present application also discloses further improvements pertaining to such structures, particularly as applied to compact modular units that are particularly low in cost, readily fabricated, and ideally suited to more demanding environments, such as the weak insolation conditions existing at northern latitudes. Details of structures incorporating the concepts disclosed herein may be appreciated by reference to a concurrently filed application entitled "Modular Solar Energy Collector Systems" Ser. No. 856,256, filed Dec. 1, 1977 by the inventor hereof and assigned to the same assignee.

SUMMARY OF THE INVENTION

The objectives of providing a high temperature differential between inlet and outlet flows, very short time constant, and high thermal efficiency, are met by employing both short flow path lengths of less than 0.5 meters in conjunction with an f number in a dual path system within a preferred range of 0.2 to 0.5. At the same time, a thin collector panel having a selective coating providing low infrared emissivity is configured to include a well distributed array of small apertures at high density, the mass flow is held within 0.002 to 0.012 kilograms/second/$m^2$, and a low channel height is used for the principal flow. Further, means may be employed in the principal flow path to bring the f number to an acceptable range and to maintain the f number substantially constant through a range of mass flows. A flow restriction in the form of distributed orifices in the principal flow path has a varying characteristic that balances against the varying characteristic of the bypass flow apertures, permitting mass flow to be increased or reduced to meet different insolation conditions without causing degradation of the performance characteristics of the system. Additionally, with good selective coatings of low infrared emissivity, the bypass fraction flow may be increased within the stated ranges to provide higher average collector temperatures and to augment the free convection suppression characteristic.

BRIEF DESCRIPTION OF THE DRAWINGS

A better understanding of the invention may be had by reference to the following description, taken in conjunction with the accompanying drawings, in which:

FIG. 1 is a side sectional view of a solar energy collector panel in accordance with the invention, somewhat simplified and idealized for clarity;

FIG. 4 is a graph of f number versus mass flow under different conditions;

FIG. 5 is a graph of efficiency versus f number under different conditions;

FIG. 6 is a graph of f number versus length of a collector panel depicting acceptable relationships in a collector in accordance with the invention; and FIG. 7 is a side sectional representation of another example of a system in accordance with the invention.

DETAILED DESCRIPTION

Figure 2:
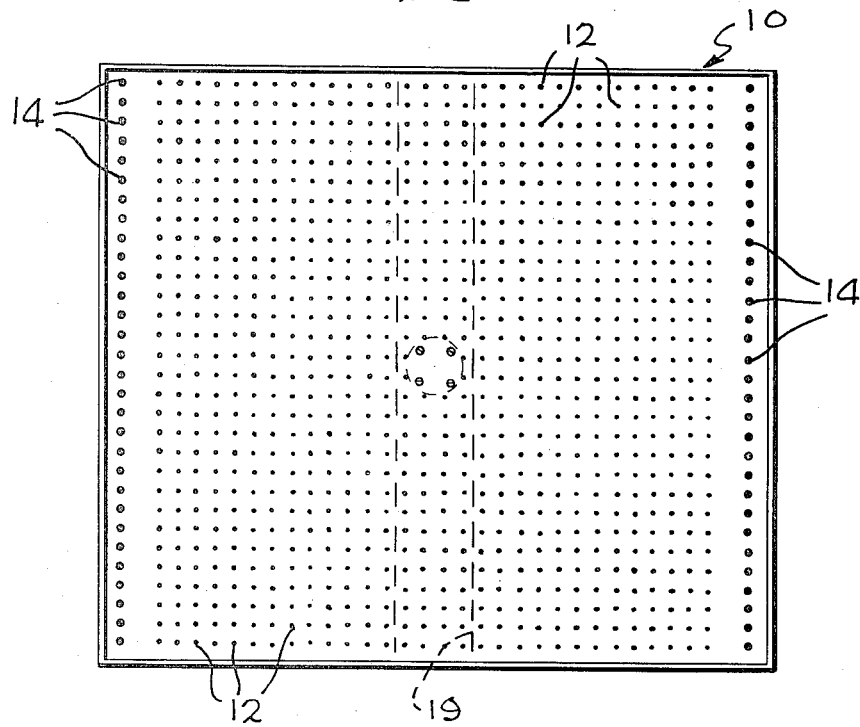
FIG. 2 is a plan view of the arrangement of FIG. 1.

A collector panel system in accordance with the invention is depicted in generalized form in FIG. 1, as to which it must be recognized that the drawing is not to scale inasmuch as many dimensions are extremely small relative to the total collector size. In FIG. 1, the collector panel 10 is a thin aluminum sheet (here approximately 0.15 mm in thickness), and having a selective low infrared emissivity coating. The panel 10 contains an array of bypass flow apertures 12, having a density in the range of 2000-3000 apertures per $meter^2$, and aperture sizes in the range of 0.2 to 0.7 mm. In this example, the hole 12 diameters are 0.5 mm and the holes are disposed on a rectangular grid at 20 mm center-to-center spacing. With unfiltered air, a smaller hole size would probably not be feasible because of the clogging of particle matter that would be likely to result. The array of apertures 12 in this instance covers approximately 70% of the total surface of the collector panel 10. Cold air is drawn under the collector panel 10 through rows of inlet orifices 14 along each side, substantially equidistant from a bisecting mid line under which hot air is to be withdrawn. A laminar flow channel of small height, here 1.5 mm, under the collector panel 10 is defined by a backing plate structure 16 which includes an integral manifold channel 18 extending along the mid line and tapering to minimum height adjacent each longitudinal end. The top periphery of the manifold is covered by a center plate 19 having a row of central orifices 20 (3 mm holes on 20 mm centers) disposed along the mid line for providing outlet flow from the laminar flow channel into the manifold 18 space. Both the backing plate 16 and the center plate 19 are of 0.15 mm aluminum sheet in this example. Projections 22 formed in the backing plate 16 engage and are coupled to the under side of the collector plate 10, these projections here having 3 mm flat top areas and being passed on 20 mm centers. The panel 10 and plate 16 provide a unified areal body which is readily handled, resistant to damage, and which is self supporting in cantilever fashion from a central support area, even though extremely thin sheet is used.

On the under side of the backing plate 16 is provided an insulative structure 30 which in this instance includes an interior outlet conduit 32, the walls of which may be covered with sealing and anti-erosion material. Central apertures 33, 34 in the base of the manifold 18 and the insulative structure 30 respectively provide communication between the manifold 18 interior and the outlet conduit 32. Mounting bolts or screws 36 engage the collector panels 10, the center plate 19 and the backing plate 16 to the insulative base structure 30, and thus support the metal areal elements centrally, so that they are free to expand and contract thermally in relation to the insulative structure 30. The outlet conduit 32 contains the heated air (or other gas) flow, and may be coupled through similar conduits of other modules along a line, and thence to a heat exchanger and blower system (not shown).

The module of FIGS. 1 and 2 provides principal flows of air on the under side of the square panel 10, as thin sheet flow masses that move laterally inward from the side margins of the panel 10 to the mid-line region. At this region, the flow masses then proceed through the orifices 20 in the center plate 19 into the manifold 18 volume, and through the apertures 33, 34 in the base structure into the outlet conduit 32. The bypass effect is established by the suction of the heated air layer above the heated panel 10, into the areally distributed bypass flow apertures 12, where the bypass flow joins the principal flow under the collector panel 10. The bypass flow apertures are principally in the heated region because in the colder region along the outer edges of panel 10 free convection losses are negligible.

Both the collector panel 10 and the backing plate 16 are heated in this configuration, with the collector panel 10 being typically hotter by approximately 10° C. at normal operating conditions with a clear sunny sky. The dual plate construction, the inlet orifices 14, which perform a significant function described in greater detail below, the centrally supported structure and other aspects of the geometry differ from the collectors disclosed in the earlier patent. The structural and operative advantages of this system are set out in detail in the concurrently filed patent application entitled "Modular Solar Energy Collector Systems."

There are, however, a number of further ramifications of the dual flow concept that must be appreciated and accounted for in configuring such systems so as to have the desired short time constants, high temperature differentials between outlet and inlet flows, and high thermal efficiency, particularly for northern latitudes in which heating requirements are most critical. At such latitudes, in all but the summer months, insolation is relatively weak, and only intermittently available. Thus when sun light is available the panel should heat quickly, the heat should be transferred to the air mass efficiently, and losses should be minimized. However, the efficient transfer of thermal energy from an insolated surface of an air mass involves a number of sometimes conflicting considerations. Suppression of free convection losses cannot be considered by itself, for example, because if the f number is increased the average collector temperature is increased, and radiative losses increase at the same time free convection losses decrease. Further, the degree of insolation available dictates variation of the air mass flow, in order to obtain the desired useful temperature differential. When overall mass flow is varied, however, the bypass flow apertures introduce pressure losses which are essentially proportional to the square of the bypass mass flow whereas the pressure loss in the main channel is nearly proportional to channel mass flow (mainly viscous pressure loss). Consequently there is a tendency to shift the resulting f number as mass flow is changed thus reducing either the thermal efficiency of the system or increasing the sum of free convection and radiative losses. Inasmuch as it may be desired to vary the mass flow over an approximately 5 to 1 range to compensate for insolation conditions, this result is undesirable.

Considering these and other factors as noted below, the collector module of FIGS. 1 and 2 is configured in accordance with the following considerations:

1. Inlet orifices 14 are provided in the principal flow path, to provide a dynamic pressure loss (essentially proportional to main flow squared) that corresponds in characteristic to the loss experienced at the bypass flow apertures, to change the initial pressure relationships, and to better balance the characteristics in the principal and bypass flow paths. In the prior patent various expedients were disclosed for reducing the pressure in the bypass flow paths, with the principal flow being unrestricted. However, it can be appreciated that inlet pressure for the principal flow could thus exceed that of the bypass flow for a considerable initial length along the flow path, so that bypass orifices could not be used in this initial region. Furthermore, with the principal flow being essentially laminar in nature, a change in mass flow would have relatively little on pressure drop, while the bypass flow pressure drop through the orifices would increase (or decrease) essentially in accordance with the square of the mass flow ($\Delta p \sim \dot{m}^2$). Consequently, bypass flow changes much more than the principal flow and the f number correspondingly changes with mass flow, shifting from the preferred value and perhaps going entirely outside an acceptable range.

Figure 3:
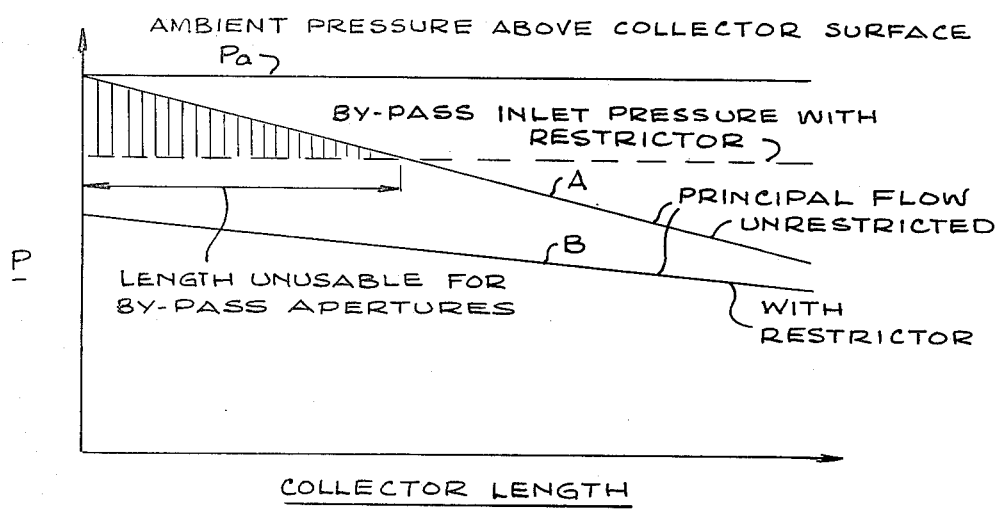
FIG. 3 is a graph of pressure variations along a collector under different conditions.

These relationships are depicted in FIGS. 3 and 4, in graphical form. In FIG. 3, the ordinate represents pressure, the abscissa represents position along the collector length and $P_a$ represents ambient pressure. Line A designates principal flow pressure decrease along the collector, which starts at ambient pressure and thus initially exceeds the bypass feed pressure if a pressure drop is used in the bypass. Line B shows the pressure variations when restrictive orifices or other means are disposed in the principal flow path, and the fact that the pressure thus is shifted to below that of the bypass flow, whether a throttling effect is used or not. Thus the previously unusable length for bypass orifices designated by shading, can now contain such orifices. In addition, the pressure drop introduced in the principal flow is of the same character ($\Delta p \sim \dot{m}^2$) as the pressure drop in the bypass orifices, so that the f number change with mass flow is small, as shown by line B. In contrast, an unrestricted principal flow gives a sharply declining characteristic, as shown by line A, and f numbers outside the acceptable range at each limit.

2. The bypass flow apertures are made as small as feasible, and widely distributed across that portion of the collector panel surface that has a temperature sufficiently high to otherwise encounter free convection losses. In the present example there are approximately 250 apertures per meter$^2$, and of 0.5 mm in diameter. However, the preferred range is from 0.2 mm to 0.7 mm, and the present example is one in which lightly filtered air is employed as the heat transfer fluid, and no separate other means are provided for cleaning the apertures. Where clogging would not be a problem or could be corrected, it would be preferred to use a greater number of apertures of smaller size to give the same f number.

3. The panel thickness should be as small as is feasible while maintaining structural soundness, in the sense of freedom from buckling and distortion. A thin heat conductor panel, here 0.15 mm, provides a short time constant structure for heat exchange with the underlying air mass.

4. The thickness of the air mass sheet, here 1.5 mm, should be between 0.5 and 2.0 mm to provide an essentially laminar flow but with good heat interchange with the heated collector panel 10, and the backing plate 16.

5. A selective surface of low infrared emissivity should be employed, preferably one of the available commercial materials having an infrared emissivity of approximately 0.2 or less. The lower the emissivity at the optimum efficiency point, the higher can be the average collector temperature, and the higher can be the f number so as to reduce the free convection losses. FIG 5, which is a graph of thermal efficiency versus f number, shows that without a selective coating there is an optimum high f number which gives a substantial increase in total efficiency as a result of a reduced overall loss (the sum of free convective and radiative losses).

6. Total mass flow should be in the range of 0.002 to 0.012 kilogram/second/meter$^2$, the mass flow being varied in approximate proportion to the incident radiation, so as to provide maximum outlet temperature with high efficiency.

7. With the above parameters maintained in the ranges indicated, and the employment of a relatively short effective flow path length along the panel and a restriction in the principal flow path, rather than a restriction in the bypass flow path. However, a matching relationship is to be observed between the f number and the effective flow path length, L, to maintain both in an acceptable range. As shown in FIG. 6, a family of curves can be plotted showing positive slope relationships between f number and L at different positions within a range, each representing particular constants for the other independent parameters, such as bypass aperture size, channel height and mass flow. However, conflicting requirements come into play and give excessive losses except in the acceptably matched range. Generally stated, the acceptable range encompasses f numbers of from 0.2 to 0.5, and the panel length L should be no greater than 0.5 meters and no less than 0.15 meters. Again it must be borne in mind that these factors pertain to the coaction within the thin panel, low height channel as modified by the other parameters mentioned. Such considerations have not been confronted in the prior art as far as is known. While length is a constant factor, minor variations in operating conditions with changes in insulation and flow mass may cause the f number to fluctuate somewhat. Nonetheless the acceptable matching range, which can be considered to lie within the broad central portion of the limited area is now well understood. If the collector panel is too short, losses would be excessive because heat conduction along the length of the panel would be too high, and efficiency too low because of the reduction of temperature differential. In contrast, if the flow path length along the channel becomes too large, the pressure losses in the channel due to the movement of the viscous air mass would also become excessive, reducing the efficiency of the system. With respect to the f number, on the other hand, an f number that is too low does not give sufficient bypass flow to minimize free convection losses, while if the f number is too high the radiative losses become excessive. When properly matched relationships are selected, however, the desired collector efficiency and outlet temperature are achieved, making possible the lightweight, compact and easily fabricated modular panels described in the concurrently filed application.

The same dual flow concepts and arrangements may be employed in a particularly simple and easily fabricated collector structure, as shown in FIG. 7. In FIG. 7, the collector panel 10' having bypass flow apertures 12 and inlet orifices 14 is configured as an arcuate member having a concave outer surface joined at its periphery to an insulative foam body 42. An integral interior conduit 44 in the foam body 42 communicates with a mid-line region under the collector 10' through an orifice 46. An essentially two piece construction may be used, as shown, in which the outer periphery of the panel 10' is retained at the outer surfaces of the insulative foam body 42 by peripheral spring clips 48. The curved configuration of the collector panel 10 permits thermal expansion and constraction to be compensated for by relative change of position of the collector panel itself. The expansion effects are not so significant, when distributed over the length of the panel 10', as to cause an undue displacement of the panel from the desired position relative to the insulative body 42.

While there have been described above and illustrated in the drawings various forms of solar energy collectors, it will be appreciated that the invention is not limited thereto but encompasses all modifications and variations falling within the scope of the appended claims.

What is claimed is:

1. A compact solar radiation collector comprising:
    collector panel means having a surface area of less than 1 m$^2$, and second panel means adjacent the collector panel means and providing a principal flow channel under the panel, said collector panel means including means providing a bypass flow with an f number (ratio of bypass flow to principal flow) in the range of 0.2 to 0.5, said collector panel means with the second panel means defining a flow path length of less than 0.5 m and a channel height of approximately 1.5 mm.

2. The invention as set forth in claim 1 above, wherein the means providing a bypass flow comprises means defining a plurality of panel apertures of from 2000 to 3000/m$^2$ in density, and wherein the mass flow is in the range of 0.002-0.012 kg/sec/m$^2$.

3. The invention as set forth in claim 2 above, wherein the panel apertures are of less than approximately 0.5 mm in size.

4. The invention as set forth in claim 3 above, wherein the collector panel means is of 0.15 mm or less in thickness and has a selective coating of low infrared emissivity.

5. The invention as set forth in claim 4 above, wherein said collector panel means includes aperture means in said panel means restricting the principal flow and having the same pressure drop characteristic as the panel apertures.

6. The invention as set forth in claim 5 above, wherein said aperture means restricting the principal flow comprise a plurality of inlet orifices.

7. The invention as set forth in claim 6 above, wherein the panel apertures are areally distributed across the interior region of the collector panel means and the inlet orifices are distributed along at least one edge of the panel means.

8. A compact solar radiation collector comprising:
    collector panel means having a surface area of less than 1 m$^2$, and second panel means adjacent the collector panel means and providing a principal flow channel under the panel, said collector panel means including means providing a bypass flow with an f number (ratio of bypass flow to principal flow) in the range of 0.2 to 0.5, said collector panel means with the second panel means defining a flow path length of less than 0.5 m and a channel height of approximately 1.5 mm, said collector further including means disposed in the principal flow path providing a restriction therein.

9. The invention as set forth in claim 8 above, wherein said means providing a restriction in the principal flow path and the means providing a bypass flow each have pressure drops varying essentially with the square of the mass flow.

10. The invention as set forth in claim 9 above, wherein said means providing a restriction in the principal flow path comprises a plurality of inlet orifices in said collector panel means.

11. A solar radiation energy collector comprising:
collector panel means including a plurality of areally distributed bypass apertures therein; and
means adjacent said collector panel means for directing a principal flow beneath said collector panel means, and said collector further including means providing a pressure drop in the principal flow.

12. The invention as set forth in claim 11 above, wherein said means for providing a pressure drop comprises means providing a flow restriction corresponding in characteristic to that of the bypass apertures.

13. The invention as set forth in claim 12 above, wherein said means providing a flow restriction comprises means in the principal flow defining a plurality of apertures providing a pressure drop essentially proportional to the square of mass flow.

14. The invention as set forth in claim 13 above, wherein said collector panel means has a selective coating of less than 0.2 infrared emissivity and a thickness of less than 0.2 mm, wherein said means for directing a principal flow provides a principal flow channel having a channel height of less than 2 mm, wherein the f number (ratio of bypass flow to principal flow) is between 0.2 and 0.5, wherein the length of the flow path along said collector panel means is between 0.15 m and 0.5 m, and wherein the mass flow is between 0.002 and 0.012 kg/sec/m$^2$.

* * * * *

UNITED STATES PATENT AND TRADEMARK OFFICE
CERTIFICATE OF CORRECTION

PATENT NO. : 4,226,226

DATED : October 7, 1980

INVENTOR(S) : Stellan Knoos

It is certified that error appears in the above-identified patent and that said Letters Patent are hereby corrected as shown below:

Column 1, line 12, "principal" should read --principle--; line 17, after "the" (first occurrence) and before "number", "f" should read --$f$--; line 41, after "an" and before "number", "f" should read --$f$--; line 49, after "the" (second occurrence) and before "number", "f" should read --$f$--; line 50, after "the" and before "number", "f" should read --$f$--. Column 2, line 7, after "of" and before "number", "f" should read --$f$--; line 9, after "versus" and before "number", "f" should read --$f$--; line 11, after "of" (first occurrence) and before "number", "f" should read --$f$--. Column 3, line 44, "sun light" should read --sunlight--; line 51, after "the" (first occurrence) and before "number", "f" should read --$f$--; line 63, after "resulting" and before "number", "f" should read --$f$--. Column 4, line 23, after "the" and before "number", "f" should read --$f$--; line 43, after "the" (second occurrence) and before "number", "f" should read --$f$--; line 46, after "and" and before "numbers", "f" should read --$f$--; line 53, "250" should read --2500--; line 61, after "same" and before "number.", "f" should read --$f$--. Column 5, line 10, after "the" (first occurrence) and before "number", "f" should read --$f$--; line 11, after "versus", "f" should read --$f$--; line 12, after "is", insert --an optimum $f$ number which gives maximum efficiency, but that with a selective coating there is--; line 13, after "high" and before "number", "f" should read --$f$--; line 27, after "the" (first occurrence) and before "number", "f" should read --$f$--; line 31, after "between" and before "number", "f" should read --$f$--; line 37, after "encompasses", "f" should read --$f$--; line 47, after "the" and before "number", "f" should read --$f$--; line 50, after "area", insert a comma --,--; line 58, after "the" (third occurrence) and

UNITED STATES PATENT AND TRADEMARK OFFICE
CERTIFICATE OF CORRECTION

PATENT NO. : 4,226,226　　　　　　　　　　　　　Page 2 of 2

DATED : October 7, 1980

INVENTOR(S) : Stellan Knoos

It is certified that error appears in the above-identified patent and that said Letters Patent are hereby corrected as shown below:

before "num-", "f" should read --$\underline{f}$--; line 59, after "an" and before "number", "f" should read --$\underline{f}$--; line 61, after "the" (first occurrence) and before "number", "f" should read --$\underline{f}$--. Column 6, line 13, "constraction" should read --$\underline{c}$ontraction--; line 32, after "an" and before "number", "f" should read --$\underline{f}$--; line 69, after "an" and before "number", "f" should read --$\underline{f}$--. Column 8, line 17, after "the" and before "num-", "f" should read --$\underline{f}$--.

Signed and Sealed this

Seventeenth Day of February 1981

[SEAL]

Attest:

RENE D. TEGTMEYER

Attesting Officer　　　Acting Commissioner of Patents and Trademarks